Jan. 18, 1955
C. E. BROUGH
2,699,565
MIXING BLADE SCRAPER
Filed July 21, 1950
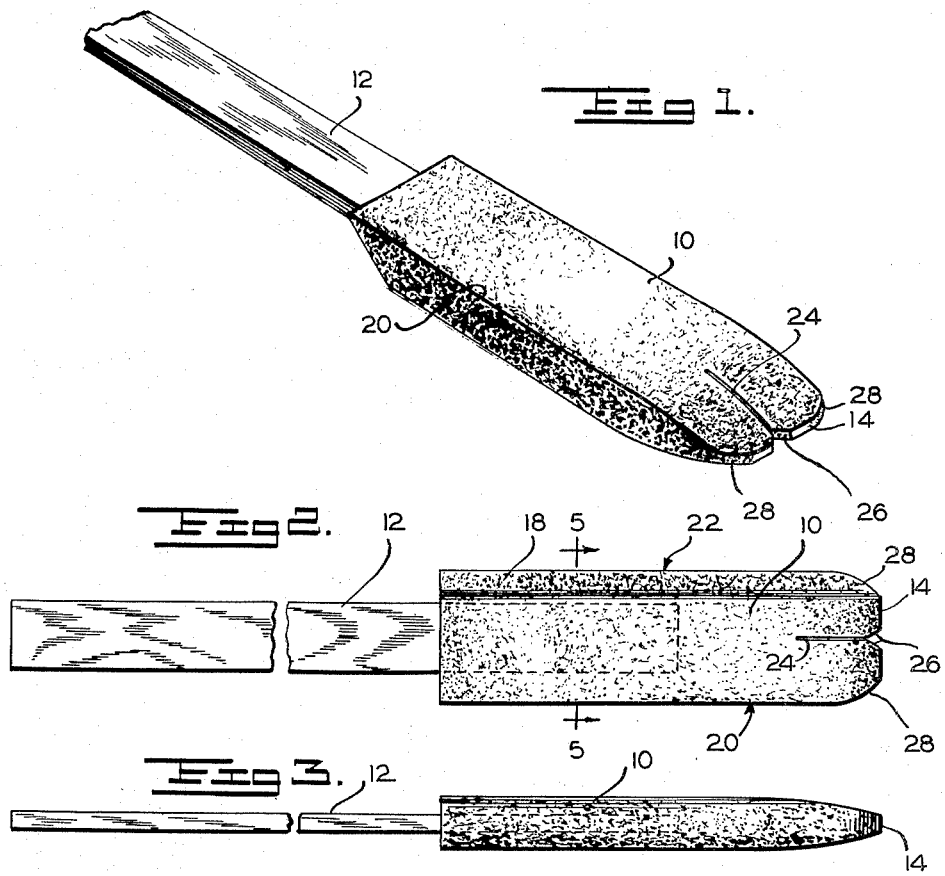
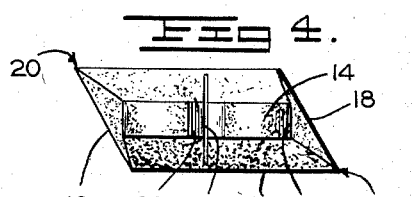
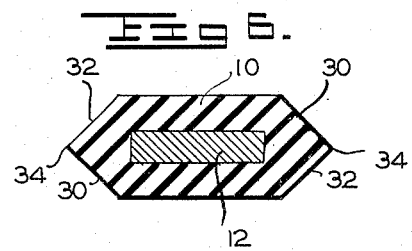
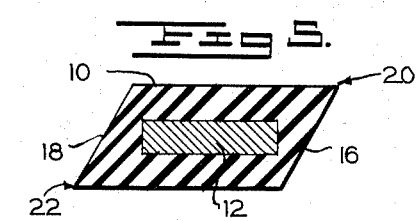
INVENTOR
CORA E. BROUGH
BY *H. Hamlin Hodges*
ATTORNEY

United States Patent Office

2,699,565
Patented Jan. 18, 1955

2,699,565
MIXING BLADE SCRAPER
Cora Elizabeth Brough, Washington, D. C.

Application July 21, 1950, Serial No. 175,108

1 Claim. (Cl. 15—236)

In recent years many electric food mixers have been utilized, and those food mixers involve the use of rotary blades which must periodically be cleaned, often while food is being prepared for cooking, eating and so forth. Often it is difficult to properly clean these food mixer blades, and sometimes it is even necessary to remove the same from the machine in order to clean the same properly before adding additional ingredients to be mixed with the previous ingredients, part of which have become adhered to the mixer blades.

An object of my invention is to provide a relatively flexible scraper which can be utilized to clean mixer blades without removing the same from the mixing machine.

A further object is to provide a mixer blade scraper having in its end a longitudinal kerf adapted to engage a mixer blade.

A further object is to provide a scraper which may be utilized not only to scrape mixer blades but also the bowl in which food stuff is being mixed.

An even further object is to provide a scraper which has on its sides relatively sharp edges for the purpose of scraping a bowl, either by a right handed operator or a left handed operator.

In the drawings:

Fig. 1 is an enlarged perspective view;
Fig. 2 is a plan view;
Fig. 3 is a view in side elevation;
Fig. 4 is an enlarged view in front elevation;
Fig. 5 is an enlarged cross-section taken on the line 5—5 of Fig. 2; and
Fig. 6 is an enlarged cross-section similar to Fig. 5 but of a modified form.

The scraper is preferably made of a suitable hardened rubber or a plastic material which may be relatively flexible and yet not readily destroyed. The flexible material is secured on a handle so that the scraper may be readily utilized in conjunction with a food mixing machine.

The main rubber, or other pliable plastic material, body portion 10 (approximately 1 inch in width and ⅜ inch in thickness) is preferably molded so that a handle 12 may be inserted therein to extend from the rear end of the rubber body portion 10. The forward end of the main body portion 10 is tapered down to provide a relatively thin nose or forward portion 14 which will be formed to be in axial alignment with the handle 12.

The sides of the main body portion 10 are formed at an angle to the main surface thereof so that the sides 16 and 18 will form a parallelogram in conjunction with the main upper and lower surfaces of the body portion 10. Thus, by the forming of the sides 16 and 18, two relatively sharp angles 20 and 22 are provided to afford edges which may be used as scrapers for the purpose of cleaning a mixing bowl or the like.

In the approximate center of the nose portion 14, I provide a kerf 24 which extends into the main body portion 10 a suitable distance, for convenience approximately ¾ of an inch. At the point where the kerf 24 intersects the nose 14 at a right angle, I provide suitable beveled edges 26 so that the kerf 24 may be readily entered by a mixer blade or the like to be cleaned. The ends 28 of the nose 14 are suitably rounded off or otherwise shaped to avoid the provision of a sharp corner.

In the modified form of my scraper, I utilize the handle 12 adapted to fit within the main body portion 10. Rather than having the body portion 10 formed in a parallelogram shape (in cross-section), as disclosed in Figs. 4 and 5, I bevel the two side portions of the body 10 at angles of approximately 135° from the main surfaces thereof to provide edges 30 and 32 which intersect one another forming right angle edges 34. The nose portion of the modified form of scraper will be substantially identical with the nose of the scraper described above and will be provided with a kerf 24 having beveled edges 26.

It will be obvious that the scraper disclosed is primarily adapted for use by a right handed operator. Thus, when it becomes desirable to clean batter or the like from mixer blades, the blade may be readily inserted into the kerf 24, it being guided there by the beveled edges 26. At the time that a cleaning operation is necessary, either the relatively sharp edge 20 or 22 will be in a position to be utilized to scrape the sides of a mixer bowl in which ingredients are being mixed.

By providing a modified form of scraper, as disclosed in Fig. 6, it will be apparent that the scraper provided may be used by either a right handed or a left handed operator. Thus, regardless of which surface of the scraper blade 10 is up, an edge 34 may be used, either by a right handed operator or a left handed operator, and will provide a surface which may readily scrape the surface of a convenient mixing bowl.

I claim:

In a scraper, a substantially rectangular main body portion of pliable material and having two flat surfaces in parallel planes, a handle extending from one end of the said scraper, side edges of said scraper being in planes providing acute and obtuse angles at their points of intersecting the planes of the two surfaces of the main body, the end of said scraper remote from the said handle tapering on both surfaces to a thin edge, and a kerf in the approximate center of said tapering edge extending longitudinally of the said scraper, the said kerf having a V-shaped and beveled opening at the tapering edge of the said scraper.

References Cited in the file of this patent

UNITED STATES PATENTS

| Number | Name | Date |
| --- | --- | --- |
| 1,401,457 | Beuckmann | Dec. 27, 1921 |
| 1,966,101 | Miller | July 10, 1934 |
| 2,065,886 | Clift | Dec. 29, 1936 |
| 2,188,114 | Hubbard | Jan. 23, 1940 |
| 2,256,650 | Reid | Sept. 23, 1941 |
| 2,280,225 | Finely | Apr. 21, 1942 |